United States Patent [19]
Ramaswamy

[11] Patent Number: 5,966,412
[45] Date of Patent: Oct. 12, 1999

[54] APPARATUS AND METHOD FOR PROCESSING A QUADRATURE AMPLITUDE MODULATED (QAM) SIGNAL

[75] Inventor: Kumar Ramaswamy, Indianapolis, Ind.

[73] Assignee: Thomson Consumer Electronics, Inc., Indianapolis, Ind.

[21] Appl. No.: 08/884,947

[22] Filed: Jun. 30, 1997

[51] Int. Cl.$^6$ .................................................. H04L 27/06
[52] U.S. Cl. .............................................. 375/341; 375/261
[58] Field of Search .................................. 375/261, 281, 375/298, 341, 262; 329/304; 332/103

[56] References Cited

U.S. PATENT DOCUMENTS

| | | | |
|---|---|---|---|
| 5,363,408 | 11/1994 | Paik et al. ................................. | 375/261 |
| 5,386,239 | 1/1995 | Wang et al. ............................. | 348/472 |
| 5,396,518 | 3/1995 | How ......................................... | 375/265 |
| 5,465,267 | 11/1995 | Todoroki ................................. | 375/341 |
| 5,511,096 | 4/1996 | Huang et al. ........................... | 375/261 |
| 5,519,734 | 5/1996 | Efraim ..................................... | 375/341 |

OTHER PUBLICATIONS

Electronics Communication Engineering Journal, Feb. 1997, articles at pp. 11–20, "DVB channel coding standard for compressing video services" by G.M.Drury and at pp. 28–32 "DVB-T: the COFDM-based system for terrestrial television" by U.Reimers.

European Telecommunication Standard ETS 300421, Dec. 1994, "Digital broadcasting systems for television, sound and data services; framing structure, channel coding and modulation for satellite services" pp. 2–27.

Summary description, "The DVB System Philosophy".

IEEE Transactions on Consumer Electronics, "Advances Two IC Chipset for DVB on Satellite Reception", M. Haas et al., vol.42, No.3, Aug. 1996, pp. 341–345.

IEEE Transactions on Consumer Electronics, "A Front–End for a Digital Satellite TV Broadcasting Receiver", M. Noda et al., vol.40, No.3, Aug. 1994, pp. 624–630.

IEEE Transactions on Consumer Electronics, "QPSK and BPSK Demodulator Chip–Set for Satellite Applications", R.v.d.Wal et al., vol.41, No.1, Feb. 1995, pp. 30–41.

IEEE Transactions on Consumer Electronics, "QAM for Terrestrial and Cable Transmission", David A. Bryan, vol.41, No.3, Aug. 1995, pp. 383–391.

IEEE Transactions on Consumer Electronics, "Simulation and Implementation of US QAM–Based HDTV Channel Decoder", Liu et al., vol.39, No.3, Aug. 1993, pp. 676–683.

IEEE Transactions on Signal Processing,"Joint Blind Equalization, Carrier Recovery, and Timing Recovery for High–Order QAM Signal Constellations", Neil K. Jablon, vol.40, No.6, Jun. 1992, pp. 1383–1397.

*Primary Examiner*—Temesghen Ghebretinsae
*Attorney, Agent, or Firm*—Joseph S. Tripoli; Eric P. Herrmann; Ronald H. Kurdyla

[57] ABSTRACT

Apparatus and method for receiving a QAM signal using a backward compatible hierarchical coding scheme to increase data transmission using finer constellations, while maintaining compatibility with existing Direct Broadcasting Satellite (DBS) systems. The apparatus employs multiple stages of decoders such that the finer constellations of the QAM signal are unraveled at different stages.

19 Claims, 5 Drawing Sheets

APPARATUS AND METHOD FOR PROCESSING A QUADRATURE AMPLITUDE MODULATED (QAM) SIGNAL

FIELD OF THE INVENTION

The present invention relates to a method and apparatus for decoding a Quadrature Amplitude Modulated (QAM) signal with a high order symbol constellation.

BACKGROUND OF THE INVENTION

Power and bandwidth are resources that are carefully conserved by digital transmission systems through the proper selection of modulation and error correction schemes. Quadrature Amplitude Modulation (QAM) is one form of multilevel amplitude and phase modulation that is frequently employed in digital communication. A QAM system modulates a source signal into an output waveform with varying amplitude and phase.

QAM is a form of two-dimensional symbol modulation composed of a quadrature (orthogonal) combination of two PAM (pulse amplitude modulated) signals. Data to be transmitted is mapped to a two-dimensional, four quadrant signal space, or constellation, having a plurality of signal (phasor) points each representing a possible transmission level. Each constellation signal point is commonly called a "symbol" and is defined by a unique binary code. The QAM constellation employs "I" and "Q" components to signify the in-phase and quadrature components, respectively, where a QAM data word or symbol is represented by both I and Q components.

QAM signals may employ words or symbols of different lengths and/or constellation shapes (e.g., circular, square, rectangular, cross, hexagonal or any arbitrary shapes). Although the present invention is described using a square QAM constellation, those skilled in the art will realize that the present invention can be modified for other QAM constellation shapes or QAM signal word of different lengths.

Generally, an increase in the number of phasor points (finer, higher order constellations) within the QAM constellation permits a QAM signal to carry more information, but the increase in density of the phasor points creates a disadvantage where the transmitted power is no longer constant. In fact, if the average transmitted signal power is limited, the maximum I and Q values are nearly the same for all the QAM levels, thereby causing the constellation points to be closely spaced as the QAM level increases. Since the distance between phasor points on a QAM constellation generally decreases with additional phasor points, it increases the complexity of distinguishing neighboring phasor points, and translates into a more expensive and complex receiver.

Thus, many older or existing DBS (Direct Broadcasting Satellite) systems employ Quaternary (Quadriphase) Phase Shift Keying (QPSK) modulation systems. For QPSK, a synchronous data stream is modulated onto a carrier frequency before transmission over the satellite channel, where the carrier can have four (phase) states, e.g., 45°, 135°, 225° or 315°. Thus, similar to QAM, QPSK employs quadriphase or quadrature modulation where the phasor points can be uniquely described using two orthogonal coordinate axes.

However, in contrast to QAM, QPSK has a "constant envelope", i.e., the pair of coordinate axes can be associated with a pair of quadrature carriers with a constant amplitude, thereby creating a four level constellation (four phasor points having a phase rotation of 90°). This large separation of phasor points decreases the complexity of performing carrier recovery operation at a receiver, and the constant envelop is extremely desirable for power sensitive satellite transmission systems. Also, the constant power level allows the satellite amplifiers to operate in saturation.

Nevertheless, the desire to increase the data throughput over a satellite channel has created a strong incentive to consider other transmission schemes instead of QPSK. Due to the existence of numerous QPSK systems, it is herein recognized as desirable to provide a method and apparatus for processing a signal such as a QAM signal using a backward compatible hierarchical coding scheme to increase data transmission using finer constellations, while maintaining compatibility with existing systems including DBS systems.

SUMMARY OF THE INVENTION

The present invention employs multiple stages of decoders such that the finer constellations of a high order constellation signal such as a QAM signal are unraveled at different stages. More specifically, at each stage, a decoder such as a Viterbi decoder operates with respect to a lower order constellation such as a QPSK constellation. By connecting a plurality of Viterbi decoders, QPSK demodulation is extended to process to 16, 64 and 256 QAM with 1, 2, and 3 extra Viterbi decoders, respectively, and so on.

BRIEF DESCRIPTION OF THE DRAWINGS

In the drawing.

In the drawings, identical reference numerals have been used to designate identical elements that are common to the figures.

DETAILED DESCRIPTION

A preferred embodiment of the invention is described in the context of a backwards compatible hierarchical (QAM) signal coding system especially attractive for use in, but not limited to, satellite transmission systems such as DBS. The system permits additional features or services to be added to a datastream without creating compatibility problems for existing direct broadcast satellite and other communications systems.

For example, an "X-QAM" constellation is represented as N hierarchical levels of another constellation such as QPSK to produce backward compatibility with existing DBS systems, resulting in a transparent system such that existing QPSK receivers can operate as originally intended. The constellation diagram preferably is hierarchically symmetrical so that the constellation (eg., QPSK) for each decoder (eg., Viterbi) is the same. Asymmetric constellations are possible, however.

More specifically, a 64-QAM signal comprises three nested QPSK constellations. The primary QPSK constellation (a quadrant of the 64-QAM signal) can be received by existing DBS receivers. If subtracted from the 64-QAM signal, a 16-QAM signal remains, at a power level 6 db lower than the received signal. The quadrants of the 16-QAM remainder are considered another DBS type signal. The decoding process continues until all levels of the QAM signal are decoded, as will be explained in greater detail. A 16-QAM system according to the invention increases the capacity of a DBS system by a factor of 2, a 64-QAM system by a factor of 3, and a 256-QAM system by a factor of 4.

Figure 1:
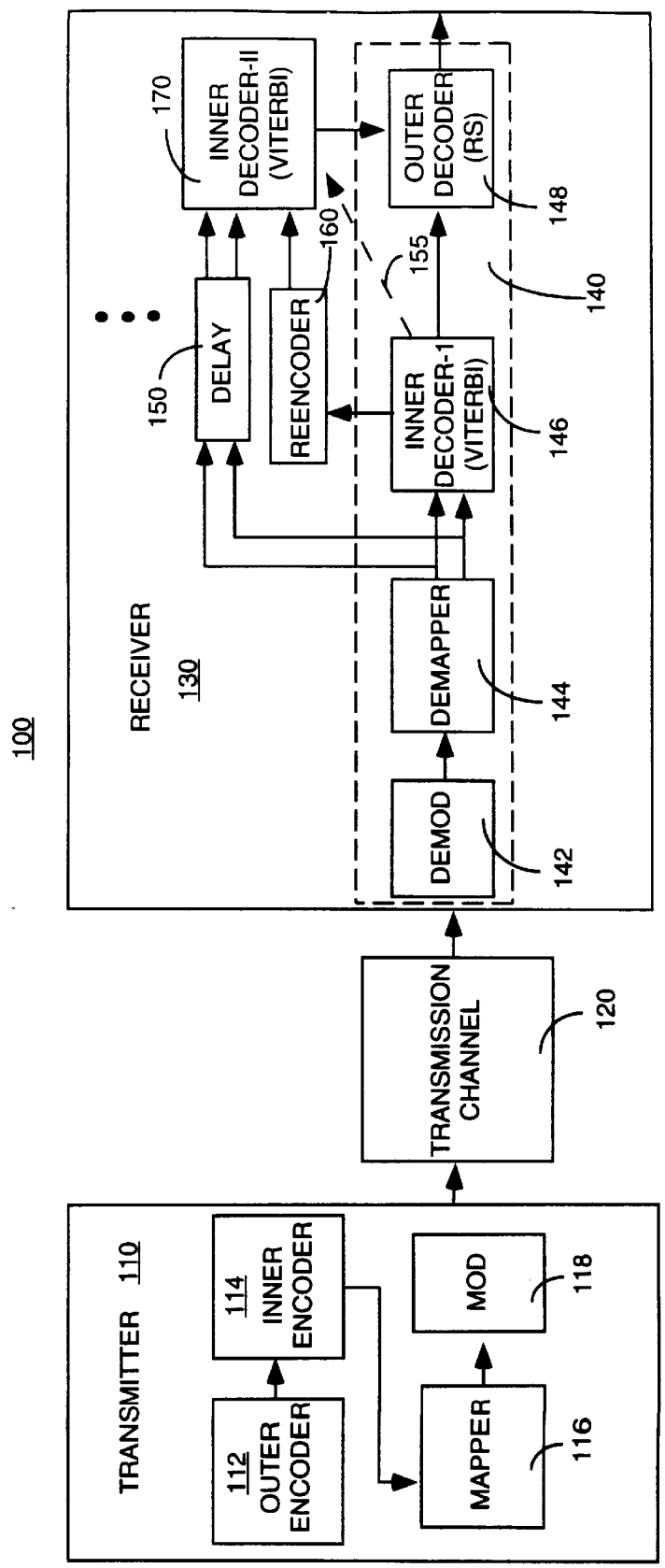
FIG. 1 depicts a block diagram of a communication system implementing the present invention.

FIG. 1 illustrates a block diagram of a communication system 100 that employs the present invention. As in many conventional communication systems, communication system 100 will input data, perform some form of processing and frequency translation within a transmitter 110. The data is transmitted over a transmission channel 120 to a receiver 130 which performs the converse operations to recover the input data.

However, unlike a conventional communication system, the present invention transmits a QAM signal using a backward compatible hierarchical coding method to increase data transmission using finer, higher order constellations, while maintaining compatibility with existing DBS systems, e.g., as illustrated in dashed box 140 in receiver 130. A detailed description is now presented below where FIGS. 1–3 should be referred to collectively to appreciate the present invention.

It is well known that communication systems must address the problem of signal degradation during transmission. However, digital systems such as satellite systems must address additional problems such as transmission path delay, interference, nonlinearity and multidestinational characteristics. Fortunately, these problems can be minimized by implementing various coding methods. As such, proper selection of a coding strategy is crucial to the performance of communications systems such as a satellite system.

FIG. 1 illustrates a communication system that employs a concatenated code. A concatenated code consists of two separate codes which are combined to form a larger code. The two codes are concatenated as illustrated in FIG. 1, where transmitter 110 comprises an outer encoder 112 and an inner encoder 114. Typically, the input signal is arranged as a series of k-bit symbols and inner encoder 114 encodes the k bits of each symbol, while outer encoder 112 encodes a block of k-bit symbols.

Concatenated coding not only enhances error correction of the transmitted signal, but also supports multiple services and multiple rate transmission. Due to its advantageous properties, many existing DBS systems are designed to decode concatenated codes.

More specifically, outer encoder 112 may implement a coding method which is referred to as "block coding". In brief, a block code is generated where each block of k information bits is mapped into a code word of length n selected from a set of $M=2^k$ code words (where k<n). Examples of block encoding methods include but are not limited to Hamming codes, Hadamard codes, Cyclic codes, and the Reed-Solomon (RS)codes.

In turn, inner encoder 114 may implement a coding method which is referred to as "convolutional coding". In brief, a convolutional code is generated by passing a data sequence to be transmitted through a linear finite-state shift register. The shift register (not shown) generally consists of K (k-bit) stages and n linear function generators. Although the present invention is described below with an outer "block" encoder and an inner "convolutional" encoder, those skilled in the art will realize that the present invention is not so limited and that other encoder combinations exist (e.g., an outer non-binary block encoder combined with an inner binary block encoder).

Returning to FIG. 1, the encoded signal from the inner encoder is passed to a mapper 116 where the encoded signal bits are mapped onto streams modulating the quadrature I and Q carriers. The mapper can be implemented as a look-up table where sets of bits from the encoded signal are translated into I and Q components (levels) representing constellation points or symbols. In the preferred embodiment, the constellation points are in accordance with a 16-QAM square constellation, where each phasor is represented by a four-bit symbol, having in-phase bits $i_1$, $i_2$, and quadrature bits $q_1$ and $q_2$. However, it should be understood that the present invention can be adapted to 64-QAM and 256 QAM constellations (and so on) as discussed below.

Finally, the I and Q components are modulated by a QAM modulator (MOD) 118, where the I channel is mixed with an intermediate frequency (IF) signal that is in phase with respect to the carrier. The Q channel is mixed with an IF that is 90 degrees out of phase. This process permits both signals to be transmitted over a single transmission channel 120 within the same bandwidth using the quadrature carriers.

At receiver 130, the I and Q components are recovered and demodulated. Since it is important that the present coding method is backward compatible with existing DBS systems, FIG. 1 illustrates a conventional (DBS) receiver 140 in dashed lines. Although the received encoded bit-stream may contain additional information, older receivers will continue to operate normally, i.e., functioning as a QPSK system. The additional information is not recovered, but the encoded bitstream is still compatible with the older receivers. This provides the important advantage of embedding additional information (e.g., on screen display (OSD) messages, increased resolution of the encoded images, or more channels), which can be unraveled by more advanced, multiple decoders as will be discussed without degrading the performance of existing receivers. A consumer has the option of upgrading to a new receiver to gain access to the added information or features, or keeping the older receiver and forego the added features and expense.

Returning to FIG. 1, the modulated signal is demodulated by demodulator 142 to produce the I and Q components. A demapper 144 attempts to translate the I and Q components (levels) into the encoded signal.

As discussed above, a satellite system may experience severe signal degradation as the signal passes through transmission channel 120. As such, it is the task of the receiver decoders to properly decipher the encoded information from a possibly corrupted bitstream. The encoded bitstream from mapper 144 is received by a first inner decoder 146, which is a "soft decision" Viterbi decoder. The Viterbi decoder implements a probabilistic decoding method where the bitstream is decoded by also considering the transmission channel statistics, rather than by a fixed set of code-dependent algebraic operation. Namely, the decoder attempts to determine the most likely values that were transmitted.

More specifically, a convolutional code can be described by a tree diagram, a state diagram or, most often, a trellis diagram. These diagrams illustrate the output sequence of a convolutional code in response to a particular input bit, thereby generating a predictable output sequence structure. Convolutional code exhibits an important behavior, where the structure repeats itself after a particular stage (otherwise known as path merges). The specific characteristics of a structure depends upon a particular convolutional code. In brief, the Viterbi decoder exploits the path merges of the trellis structure of the convolutional code and exhaustively examines all distinct paths at every trellis level. The Viterbi decoder then computes the most likely path from a plurality of "surviving" paths, where the selected path is generally the minimum distance path. In this fashion, the Viterbi decoder is able to error correct corrupted bitstream at the expense of increasing the computational overhead.

Although the first inner decoder is described as a Viterbi decoder, other decoders may be used. Other decoding methods (whether soft decision or hard decision) such as "sequential decoding" or various modified Viterbi decoding methods can be implemented in the first inner decoder.

Figure 2:
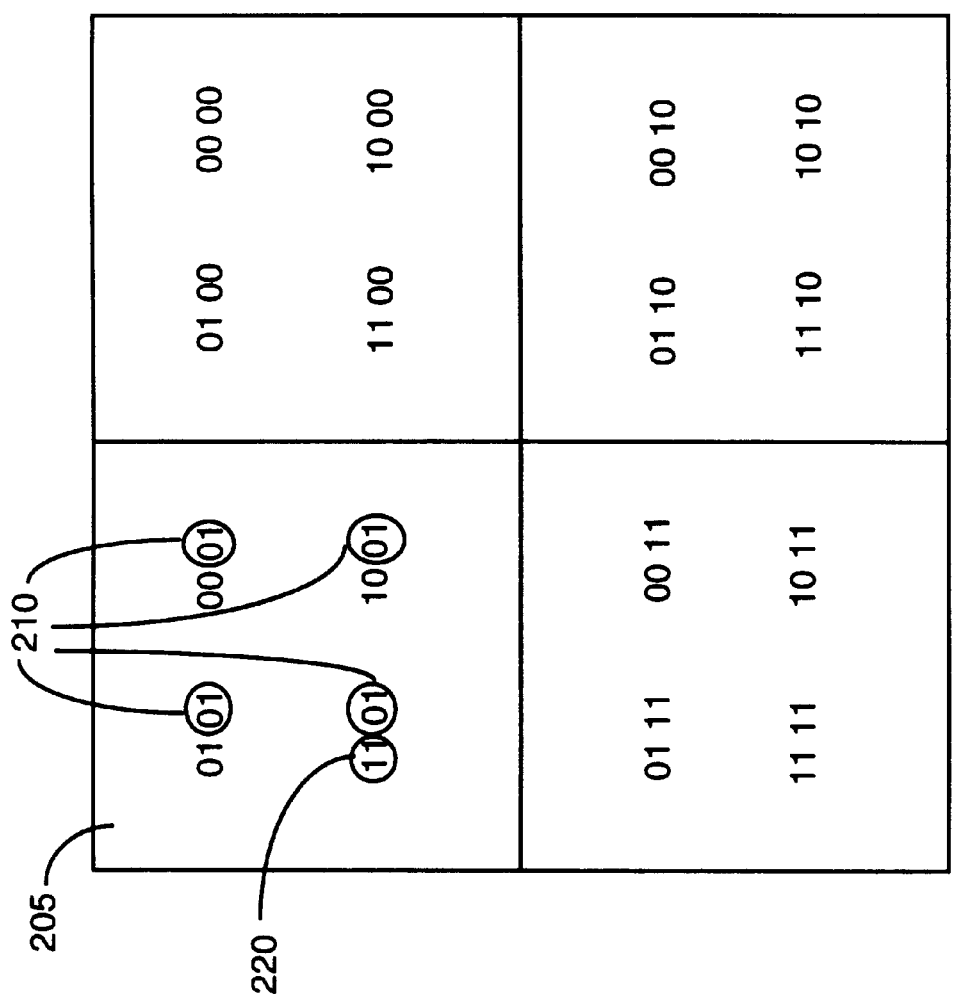
FIG. 2 depicts a 16-QAM constellation diagram with respect to a system implementating the present invention.

In the preferred embodiment, first Viterbi decoder 146 operates with respect to a QPSK constellation, as in older existing receivers. Namely, the first Viterbi decoder is only able to isolate the encoded signal to one quadrant. More specifically, FIG. 2 illustrates a 16 QAM constellation diagram having 16 constellations points or symbols occupying four quadrants. The two least significant bits (LSB) 210 of each symbol isolate the encoded signal to a quadrant. Namely, the LSB of all points in a quadrant are identical. As such, first Viterbi decoder 146 is only able to decode the two LSB 210 of the received symbol from the encoded signal.

The first Viterbi decoder 146 within existing receivers is generally not designed to produce the symbol itself, but instead, produces a convolutionally decoded data bit(s) represented by the symbol. As such, two LSB 210 of the received symbol is regenerated after the decoded data bit is reencoded by reencoder 160 as discussed below.

To illustrate, if the encoded signal carries the symbol "1101", then the first Viterbi decoder is only able to isolate the encoded signal to quadrant 205, thereby producing the bits "01". However, the two most significant bits (MSB) "11" 220 of the symbol are not decoded by the first Viterbi decoder, since its capability is limited to a QPSK constellation. The additional information is simply ignored by the first Viterbi decoder, where, in turn, it is decoded by other decoders in the receiver as discussed below.

Returning to FIG. 1, the decoded signal from first Viterbi decoder 146 is passed to outer decoder 148. Namely, the bits corresponding to block encoded words are passed to outer decoder 148. It is the task of the outer decoder to detect and account for the error pattern in the received code word and generate the proper code word, i.e., the original input or source signal encoded by the transmitter. Namely, the outer decoder unravels the outer layer of encoding to produce the original input signal.

Generally, the outer decoder compares the received code word with "M" possible transmitted code words (which depends upon the block code implemented at the transmitter) and chooses the code word that is closest in Hamming distance to the received code word. The Hamming distance is a measure of the number of bit positions in which two code words differ.

In the preferred embodiment, the outer decoder is a Reed-Solomon (RS) decoder. The Reed-Solomon code is a linear non-binary block code which is a subclass of the Bose-Chaudhuri-Hocquenghem (BCH) block codes. The RS decoder is well known for its capability to address burst errors, especially when used in combination with interleaving strategies. Interleaving is a process where errors are distributed over several encoded sequences to minimize the effect of a long burst error, which may corrupt the encoded sequence beyond the error correction capability of the code. Thus, a transmitter may incorporate an interleaver (not shown) before modulating the encoded signal, which, in turn, requires the receiver to incorporate a deinterleaver (not shown) after performing demodulation.

Although the disclosed system employs an outer RS decoder, various other block decoding methods can also be implemented within the outer decoder. Thus, if a receiver comprises only portion 140 as illustrated in FIG. 1, such receiver would still be able to unravel and decode the encoded bitstream transparently with respect to a QPSK constellation.

Returning to FIG. 1, if finer constellations are to be unraveled, then a second Viterbi decoder 170 is employed to decode the next level or resolution in the hierarchical code. More specifically, second decoder 170 receives inputs from a reencoder 160 and delay 150. The reencoder receives the decoded bits from the first Viterbi decoder and reencodes these bits to provide the quadrant information necessary for the second Viterbi decoder. Specifically, the first Viterbi decoder isolates to a quadrant with respect to a QPSK constellation and then using this constellation point, removes the convolutional coding and produces a decoded data bit. The decoded data bit from the first Viterbi decoder 146 is the actual signal which is generally subjected to block encoding. This decoded data bit is not useful to the second Viterbi decoder in this form and is therefore reencoded to define the quadrant in which the second Viterbi decoder is to operate.

Since the present invention is described with reference to an existing DBS system, it is assumed that Viterbi decoder 146 is only able to generate a decoded data bit. However, those skilled in the art will realized that a Viterbi decoder can be implemented such that the quadrant information can be extracted directly from first Viterbi decoder 146 via path 155 without the use of reencoder 160.

Delay section 150 receives inputs from demapper 144 and delays the encoded signal. Since first Viterbi decoder 146 and reencoder 160 incur a certain amount of latency (delay) in performing their operations, this delay is necessary to synchronize the data from the reencoder with the appropriate data from the demapper. Once synchronization is achieved, second Viterbi decoder 170 then further isolates the signal to a quadrant within the quadrant specified by first Viterbi decoder 146.

To illustrate, returning to FIG. 2, the first Viterbi decoder may isolate the signal to the quadrant "01" (the two LSB) 210, but it is unable (or is not designed) to refine the isolation to the two MSB "11" 220 in this quadrant. As such, reencoder 160 informs second Viterbi decoder 170 to operate in this upper left most quadrant where the second Viterbi decoder isolates the signal to "11" 220. The first Viterbi decoder is effectively defining which portion (subset) of the 16 QAM constellation for second Viterbi decoder to operate. In this manner, the second Viterbi decoder 170 unravels the two MSB and produces decoded data bits to outer decoder 148 where block decoding is performed to recover the original input signal encoded by the transmitter. It should be noted that block decoding performed by RS decoder 148 is implemented in an interleaved fashion for backward compatibility reasons. However, there are many possible architectures for the block decoding. Each additional Viterbi inner code could be conceivably linked to an outer interleaving/Reed-Solomon coding scheme. It is also possible to design a single interleaving/block outer coding scheme for all but the innermost convolutional code (for compatibility reasons).

Extending this architecture, it is possible to decode ever finer constellations with additional Viterbi decoding stages, e.g., delay 150, reencoder 160 (optional) and second Viterbi decoder 170 constitute a single decoding stage (Viterbi decoding stage). For example, a third Viterbi decoding stage (not shown) can be added to the receiver 130 to decode a 64 QAM signal.

Figure 3:
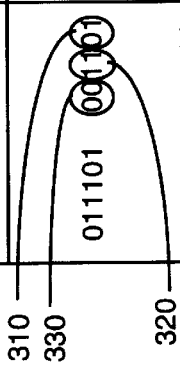
FIG. 3 depicts a 64-QAM constellation diagram with respect to a system implementing the present invention.

To illustrate, FIG. 3 depicts a 64 QAM constellation. The first Viterbi decoder 146 is able to isolate the signal to the two LSB "01" 310 of the received symbol which define 16 possible constellation points in the upper left most corner of the constellation diagram. In turn, second Viterbi decoder 170 is able to further isolate the signal to the two average significant bits (ASB) "11" 320, which define four (4) possible constellation points in the lower left most corner within the region of the constellation diagram defined by the first Viterbi decoder. Finally, the third Viterbi decoder (not shown) is able to ultimately isolate the signal to the two MSB "00" 330 which define a particular constellation point from the four (4) remaining possible constellation points. In this fashion, a symbol "001101" is unraveled using three different stages of Viterbi decoders.

Thus, it is possible to represent an "x-QAM" constellation as "n" hierarchical levels of (QPSK) constellation. For example, a 16-QAM constellation can be represented as two (2) hierarchical levels of (QPSK) constellation and a 64-QAM constellation can be represented as three (3) hierarchical levels of (QPSK) constellation and so on.

It should also be noted that the constellation diagram is hierarchically symmetrical. Namely, the QPSK constellation for each Viterbi decoder is the same. For example, the constellation point "00" is always the upper right most constellation point, such that the constellation point "000000" is the upper right most constellation point for the 64 QAM constellation diagram, and so on for a 256 QAM constellation. This symmetry simplifies the construction of the receiver where similar Viterbi decoders of low complexity can be used in any decoding stage. However, it should be understood that the present invention is not so limited and that other constellation orders can be used.

Figure 4:
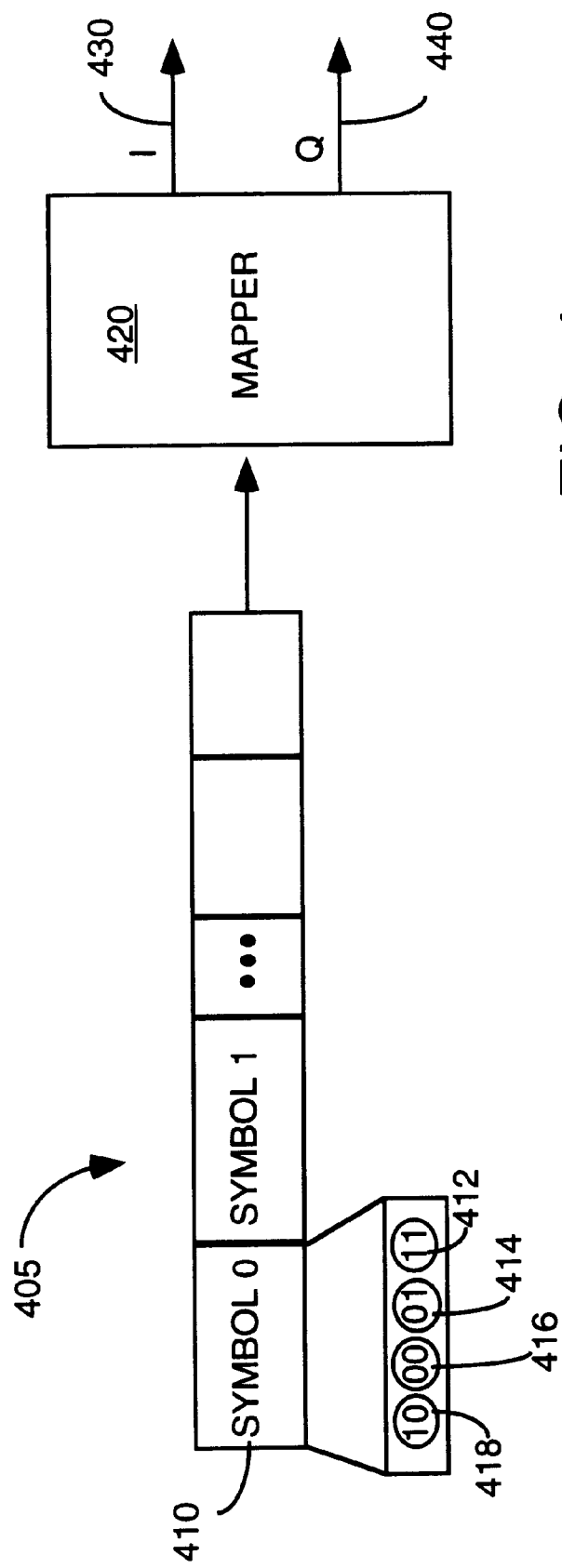
FIG. 4 is a block diagram depicting the mapping of a data streams into I and Q components.

FIG. 4 illustrates a block diagram depicting the mapping of a data stream 405 into I and Q components on paths 430 and 440 respectively via a mapper 420. To exploit the receiver architecture of FIG. 1, the encoded bitstream is mapped hierarchically into I and Q components such that receivers of different complexity will be able to decode the encoded bitstream without encountering compatibility problems.

More specifically, encoded bitstream 405 comprises a plurality of bits which are grouped into a plurality of symbols 410. Each successive pair of bits starting from the LSB to the MSB within each symbol is unraveled by successive Viterbi decoding stages as discussed above. Namely, bits 412, 414, 416 and 418 are unraveled by the first, second, third and fourth Viterbi decoding stages respectively. Each pair of bits may represent a different channel, a different service or a different resolution. This advantageous hierarchical coding method permits additional features or services to be added into the bitstream without creating compatibility problems for existing DBS systems.

In FIG. 4, each symbol is an eight bit symbol associated with a 256-QAM signal constellation. Each symbol is constituted by four two-bit pairs 412, 414, 416 and 418, where each pair of bits of each symbol represents information for a different service or feature. The illustrated 8-bit symbol 10 00 01 11 represents a 256-QAM constellation as illustrated, a nested 64-QAM constellation (bits 00 01 11), a nested 16-QAM constellation (bits 01 11) and a nested QPSK constellation symbol (bits 11). The symbol bits are designated most significant (418) to least significant (412) from left to right. In this hierarchical ordering of QPSK constellations, each successive pair of symbol bits from the LSB to the MSB is successively decoded, or unraveled, at a receiver by successive decoders as explained previously. Thus high order QAM constellations are decoded as QPSK.

Figure 5:
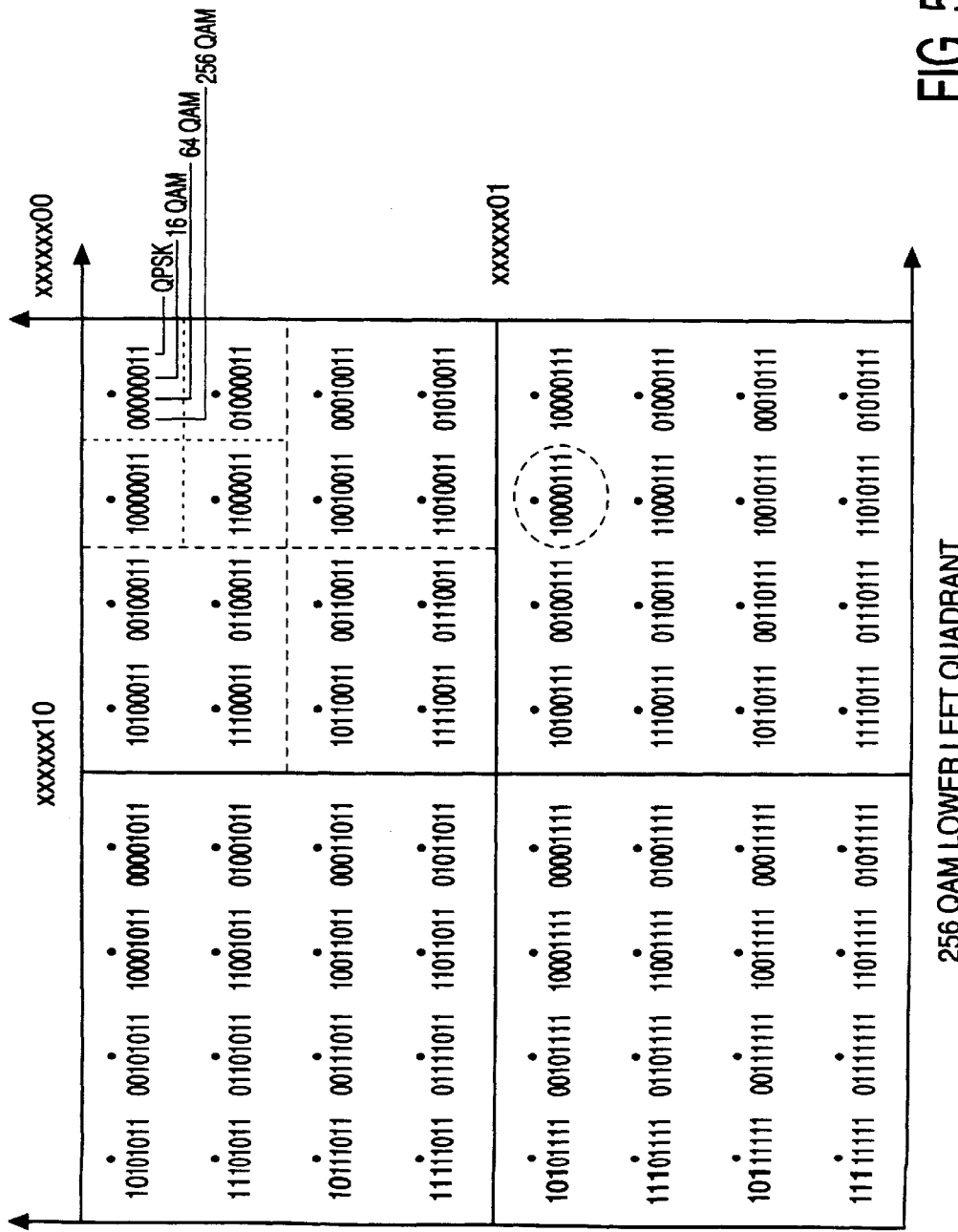
FIG. 5 depicts a constellation diagram to facilitate a better understanding of a system according to the principles of the present invention.

One possible arrangement of the hierarchical constellations is shown in more detail in FIG. 5. FIG. 5 shows the hierarchical progression of constellations from a two bit/symbol QPSK (highlighted in the uppermost right corner of FIG. 5), to a four bit/symbol 16-QAM constellation which represents the first level finer unraveling of the constellation, then to a six bit/symbol 64-QAM constellation, finally to a 256-QAM constellation. Only a portion of the lower left quadrant of the 256-QAM constellation is shown.

The symbol points in the illustrated lower left quadrant of the 256-QAM constellation are of the form xxxxxx11 such that all of the 64 constellation points in this quadrant have two common LSBs of "11." Similarly, all of the 64 points in each of the other quadrants of the 256-QAM constellation are of the form xxxxxx00 for the upper right quadrant, xxxxxx10 for the upper left quadrant, and xxxxxx01 for the lower right quadrant. It is noted that the bit combinations 00, 10, 11 and 01 are respectively associated with the signal points in the four quadrants of a QPSK constellation.

At the next level, 16 constellation points (of which there are four clusters shown in FIG. 5) have the third and fourth signal bits in common in respective quadrants (in addition to the LSBs noted above) corresponding to a 16-QAM constellation. At the third level, 4 constellation points (of which there are 16 clusters) have another two signal bits in common in respective quadrants. Finally, at the fourth level, each point represents a unique 256-QAM constellation point. The 256-QAM signal point discussed in connection with FIG. 4, "10000111," is highlighted with a dotted outline in the lower right quadrant of FIG. 5.

It should be noted that although alignment can be performed on symbol boundaries, it can also be implemented on packet boundaries as well. Additionally, it is possible to map the bits from MSB to LSB order.

In the preferred embodiment, if additional services are added, additional power is generally transmitted at the rate of an additional 3 dB for each doubling of the signal constellation. To achieve the same error performance, the SNR (signal to noise ratio) needs to be increased roughly by 3 db for every doubling of the signaling alphabet. An additional backoff is necessary especially in satellite systems so that the traveling wave tube (TWT) amplifiers are not operated in saturation as is often the case with QPSK systems. This is necessitated by the fact that QAM systems are much more susceptible to non-linear distortion effects caused by saturating amplifiers. Alternatively, it is possible to minimize the increase in transmitted power by making some coding tradeoffs.

Furthermore, the present hierarchical coding/decoding method is not limited to satellite systems and can be extended to provide varying grades of service over other media as well.

What is claimed is:

1. A receiver for receiving a Quadrature Amplitude Modulation (QAM) modulated bitstream containing phasor points represented in a QAM constellation, said receiver comprising:

a first decoder for decoding the QAM modulated bitstream with respect to a Quaternary Phase Shift Keying (QPSK) constellation to produce a decoded bitstream; and a second decoder, coupled to said first decoder, for decoding the QAM modulated bitstream with respect to a QPSK constellation within a hierarchial subset region of the QAM constellation defined by said first decoder.

2. The receiver of claim 1, wherein said first and second decoders are convolutional decoders.

3. The receiver of claim 2, wherein said convolutional decoders are Viterbi decoders.

4. A receiver for receiving a Quadrature Amplitude Modulation (QAM) modulated bitstream containing phasor points represented in a QAM constellation, said receiver comprising:

a first decoder for decoding the QAM modulated bitstream with respect to a Quaternary Phase Shift Keying (QPSK) constellation to produce a decoded bitstream;

a second decoder, coupled to said first decoder, for decoding the QAM modulated bitstream with respect to a QPSK constellation within a subset region of the QAM constellation defined by said first decoder;

a delay, coupled to said second decoder, for applying a delay; and a reencoder, coupled to said first decoder, for generating information relating to said subset region defined by said first decoder.

5. The receiver of claim 4, wherein said delay, said reencoder and said second decoder forms a decoding stage, where additional decoding stages are added to decode finer constellations of the QAM modulated bitstream.

6. A receiver for receiving a Quadrature Amplitude Modulation (QAM) modulated bitstream containing phasor points represented in a QAM constellation, said receiver comprising:

a first decoder for decoding the QAM modulated bitstream with respect to a Quaternary Phase Shift Keying (QPSK) constellation to produce a decoded bitstream;

a second decoder, coupled to said first decoder, for decoding the QAM modulated bitstream with respect to a QPSK constellation within a subset region of the QAM constellation defined by said first decoder; and an outer decoder, coupled said first decoder, for decoding said decoded bitstream from said first decoder.

7. The receiver of claim 6, wherein said outer decoder is a block decoder.

8. The receiver of claim 7, wherein said block decoder is a Reed-Solomon decoder.

9. A method of decoding a Quadrature Amplitude Modulation (QAM) signal having a plurality of QAM phasor points represented by a QAM constellation diagram having "n" hierarchical levels of Quaternary Phase Shift Keying (QPSK) constellation, said method comprising the steps of:

a) using a first decoder to decode a first hierarchical level of the QAM signal with respect to a QPSK constellation to produce a decoded signal; and b) using a second decoder to decode a second hierarchical level of the QAM signal with respect to a QPSK constellation, within a subset region of the QAM constellation defined by said first decoder.

10. A method of decoding a Quadrature Amplitude Modulation (QAM) signal having a plurality of QAM phasor points represented in a QAM constellation diagram having "n" hierarchical levels of Quaternary Phase Shift Keying (QPSK) constellation, said method comprising the steps of:

a) using a first decoder to decode a first hierarchical level of the QAM signal with respect to a QPSK constellation to produce a decoded signal;

b) using a second decoder to decode a second hierarchical level of the QAM signal with respect to a QPSK constellation, within a subset region of the QAM constellation defined by said first decoder; wherein additional decoders are used to decode additional hierarchical levels of the QAM signal.

11. The method of claim 9, wherein said first and second decoders are convolutional decoders.

12. The method of claim 11, wherein said convolutional decoders are Viterbi decoders.

13. A method of decoding a Quadrature Amplitude Modulation (QAM) signal having a plurality of QAM phasor points represented by a QAM constellation diagram having "n" hierarchical levels of Quaternary Phase Shift Keying (QPSK) constellation, said method comprising the steps of:

a) using a first decoder to decode a first hierarchical level of the QAM signal with respect to a QPSK constellation to produce a decoded signal; and b) using a second decoder to decode a second hierarchical level of the QAM signal with respect to a QPSK constellation, within a subset region of the QAM constellation defined by said first decoder;

further comprising the steps of:
a1) applying a delay to the QAM signal; and
a2) encoding said decoded signal from said first decoder to generate information relating to said subset region defined by said first decoder.

14. A method of decoding a Quadrature Amplitude Modulation (QAM) signal having a plurality of QAM phasor points represented by a QAM constellation diagram having "n" hierarchical levels of Quaternary Phase Shift Keying (QPSK) constellation, said method comprising the steps of:

a) using a first decoder to decode a first hierarchical level of the QAM signal with respect to a QPSK constellation to produce a decoded signal; and b) using a second decoder to decode a second hierarchical level of the QAM signal with respect to a QPSK constellation, within a subset region of the QAM constellation defined by said first decoder;

further comprising the step of:
c) using a third decoder to decode said decoded signal from said first decoder.

15. The method of claim 14, wherein said third decoder is a block decoder.

16. The method of claim 15, wherein said block decoder is a Reed-Solomon decoder.

17. In a satellite signal receiver, a method of decoding a Quadrature Amplitude Modulation (QAM) signal having a plurality of QAM symbol points represented by a QAM constellation diagram having N hierarchical levels of a Quaternary Phase Shift Keyed (QPSK) constellation, said method comprising the steps of:

demodulating an input QAM signal received from a satellite transmission channel to produce a demodulated QAM signal; and using a plurality of decoders for successively decoding respective hierarchical levels of said demodulated QAM signal.

18. A method according to claim 17, wherein said step of successively decoding respective hierarchical levels is with respect to a QPSK constellation.

19. A method according to claim 17, wherein said decoders are Viterbi decoders.

* * * * *